United States Patent [19]

Fay

[11] 4,212,609

[45] Jul. 15, 1980

[54] METHOD AND APPARATUS FOR PRODUCING SHAPED AND SIZED FOOD ARTICLES

[76] Inventor: Rudolph J. Fay, 6911 Wildflower Trail, Cincinnati, Ohio 45200

[21] Appl. No.: 906,452

[22] Filed: May 17, 1978

[51] Int. Cl.$^2$ .................. A21C 11/00; A22C 7/00; B29C 3/02
[52] U.S. Cl. .......................... 425/100; 17/32; 425/182; 425/193; 425/220; 425/231; 425/362; 425/437
[58] Field of Search ............... 425/100, 182, 220, 227, 425/231, 363, 437, 362, 193, 194; 17/32; 264/335, 39

[56] References Cited

U.S. PATENT DOCUMENTS

| | | | |
|---|---|---|---|
| 1,575,688 | 3/1926 | Joannides | 425/227 X |
| 1,825,559 | 9/1931 | Sumner | 425/437 X |
| 1,839,731 | 1/1932 | Baum | 425/437 X |
| 1,960,367 | 5/1934 | Bellingroth | 425/100 |
| 3,205,837 | 9/1965 | Fay | 425/220 X |
| 3,427,649 | 2/1969 | Fay | 264/335 X |
| 4,009,978 | 3/1977 | Hanning | 425/437 X |

Primary Examiner—Jan H. Silbaugh
Attorney, Agent, or Firm—Wood, Herron & Evans

[57] ABSTRACT

A method and machine for producing a configurated and specified weight food product in die cavities of a rotary die roll, each of the die cavities being defined by a configurated side wall and a porous bottom wall. During each revolution of the roll a batch of the product is forced into each cavity as the cavities pass beneath a hopper. Upon continued rotation of the roll, the bottom walls of the cavities are moved outwardly so as to force the configurated products from the die cavities. Tempered air at a controlled temperature and at a pressure above that of the atmosphere is directed through the porous bottom walls while the bottom wall is extended so that the configurated product is forced off of the wall and onto a conveyor located beneath the die roll. To facilitate cleaning of the porous dies, the die roll is so constructed that hot water may be directed through the air flow passage during cleaning and the porous bottom wall dies of the drum may be easily removed from the drum without drum disassembly.

16 Claims, 9 Drawing Figures

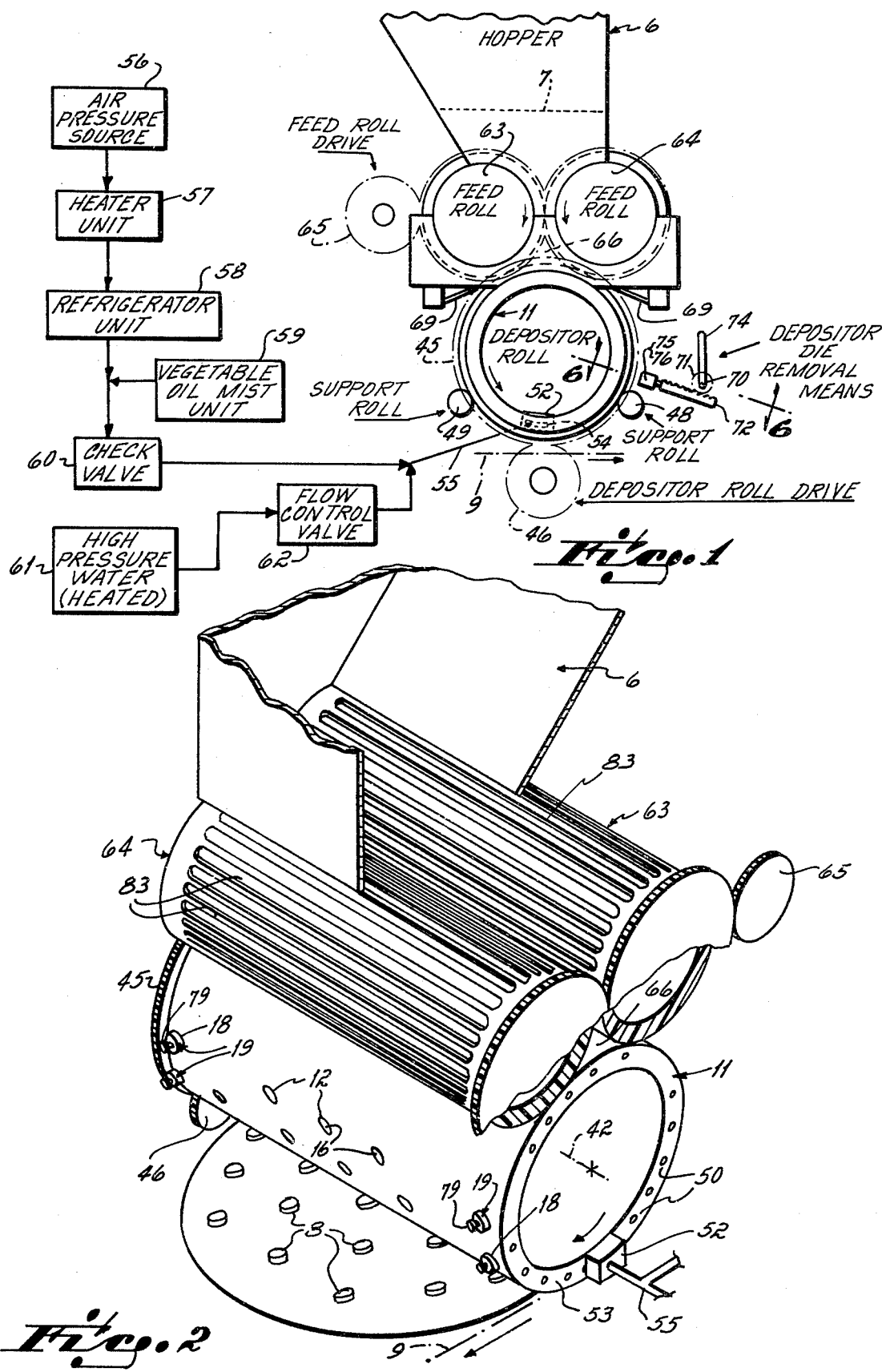

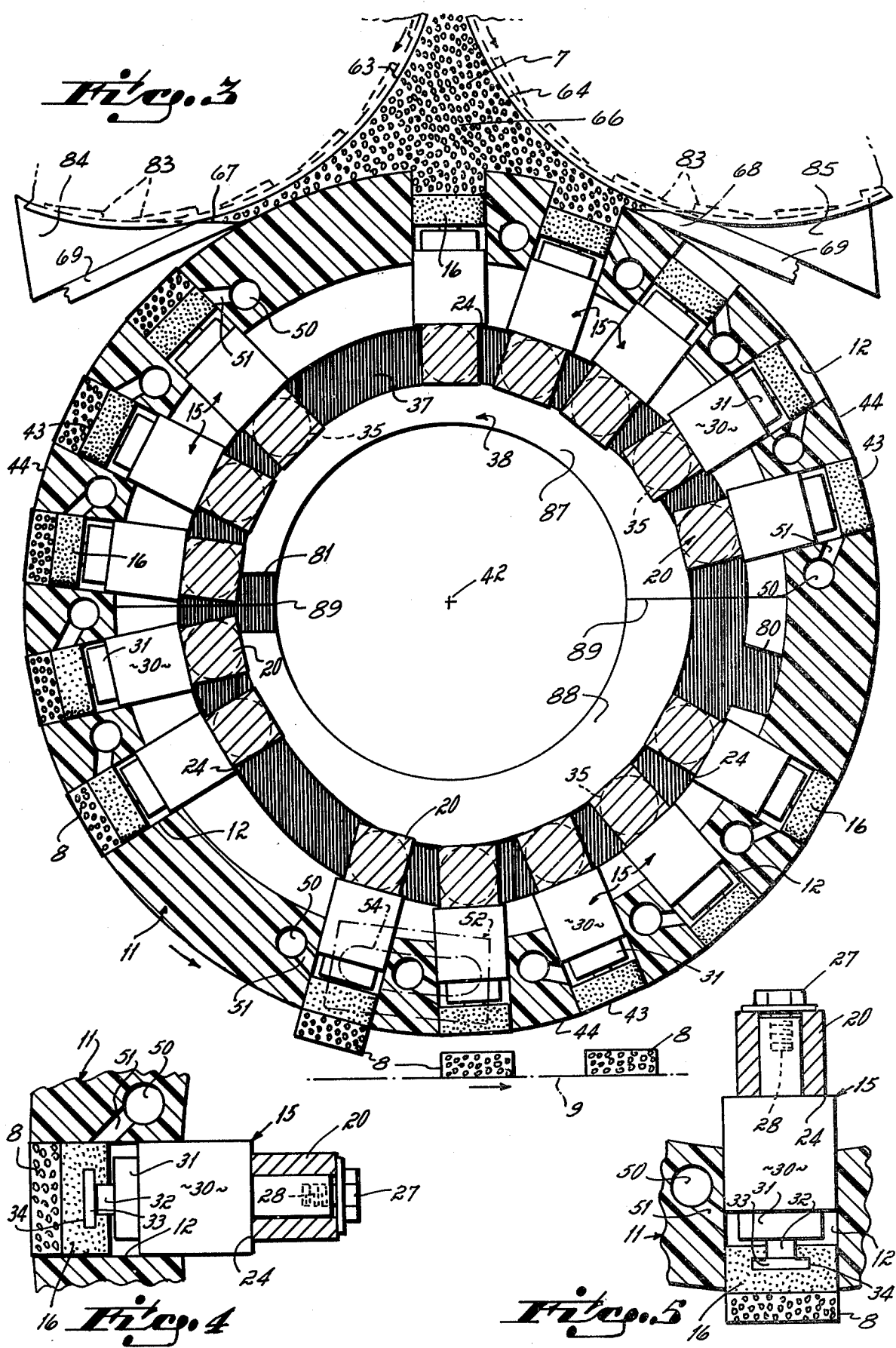

METHOD AND APPARATUS FOR PRODUCING SHAPED AND SIZED FOOD ARTICLES

This invention relates to a method and apparatus for producing specific shapes and weights of food products and, more particularly, to apparatus for producing specific shapes and weights of food products within configurated die cavities.

In the course of high volume automated food production, it is often desirable to automatically shape a predetermined weight of food substance. Shaping is often done in die cavities. However, in the case of many food substances such as sausage meat products, die cavity forming has heretofore been impractical because of the difficulty of rapidly and positively extracting the configurated product from the die cavity and of maintaining the die cavities bacteria free.

It has been, therefore, a primary objective of this invention to provide an improved method and apparatus for automatically shaping predetermined weights of food substances in die cavities and for extracting these configurated products from the dies.

One aspect of this invention is predicated upon the concept of utilizing tempered air introduced through a porous die member in the bottom of a die cavity to break the surface adhesion between the die and the formed substance and to prevent the food substance from adhering to the porous surface or from clogging the pores of the die member. In the case of a meat product such as sausage, the tempered air is maintained at a temperature of approximately 250° F. and the meat is processed at a temperature very close to its freezing temperature of 27° F., as for example 25° F.-30° F. At this air temperature, the heated air directed through the sintered metal die at the bottom of the die cavity prevents the grease in the meat from congealing and clogging the pores of the dies. In the case of a cookie dough, the tempered air is maintained at a temperature of approximately 30° F. and the dough is processed at a temperature on the order of 80° F. At this air temperature the cooled air directed through the sintered metal die refrigerates the surface of the dough and prevents the dough from sticking to the die.

The practice of using air pressure to eject products from die cavities and to avoid adhesion of the product to the die cavity is old as evidenced by my earlier U.S. Pat. No. 3,205,837 and U.S. Pat. No. 3,427,649. Additionally, it is known to use ejection plungers to eject formed substances from die cavities as disclosed in these patents. However, to my knowledge no one has ever used a porous bottom die cavity member through which tempered air is passed to positively eject formed substance from a die cavity and simultaneously control the stickiness or state of the food product contained in the die cavity.

Still another aspect of this invention is predicated upon the concept of constructing a die cavity containing rotary die roll used in the practice of this invention in such a fashion that air flow passages of the roll are all water tight so that high pressure, high temperature water may be directed through the passages and through the die cavities. This high temperature water, generally at a temperature on the order of 200° F. and at a pressure on the order of 900 pounds per square inch, flushes any food particles out of the die roll and thereby prevents bacteria growth in the roll. Of course, the water may have additives contained in it, as for example caustic soda, to further inhibit bacterial growth.

Still another aspect of this invention is predicated upon the construction of the die roll and an associated die puller which enables the sintered metal dies in the die cavities to be easily removed from the rolls for cleaning purposes. When porous sintered dies are used with meat products, the die must be regularly removed and cleaned at high temperatures and high pressures to remove any meat from the pores of the metal die. This invention therefore incorporates a die puller mounted upon the machine and dies removably mounted upon die pins from which enable the sintered metal dies to be removed from the roll without removal of the roll from the machine or disassembly of the roll.

The primary advantage of this invention is that it enables many substances to be automatically formed in die cavities which heretofore have required other more expensive and wasteful handling techniques.

These and other objects and advantages of this invention will be more readily apparent from the following description of the drawings in which:

FIG. 1 is a partially diagrammatic side elevational view of an apparatus for practicing the invention of this application.

FIG. 2 is a partially diagrammatic, cross-sectional perspective view of a portion of the apparatus of FIG. 1.

FIG. 3 is a cross-sectional view of a portion of the apparatus disclosed in FIG. 1.

FIG. 4 is an enlarged cross-sectional view of a portion of the apparatus disclosed in FIG. 3.

FIG. 5 is a view similar to FIG. 4 but illustrating the apparatus in a different position.

Figure 6:
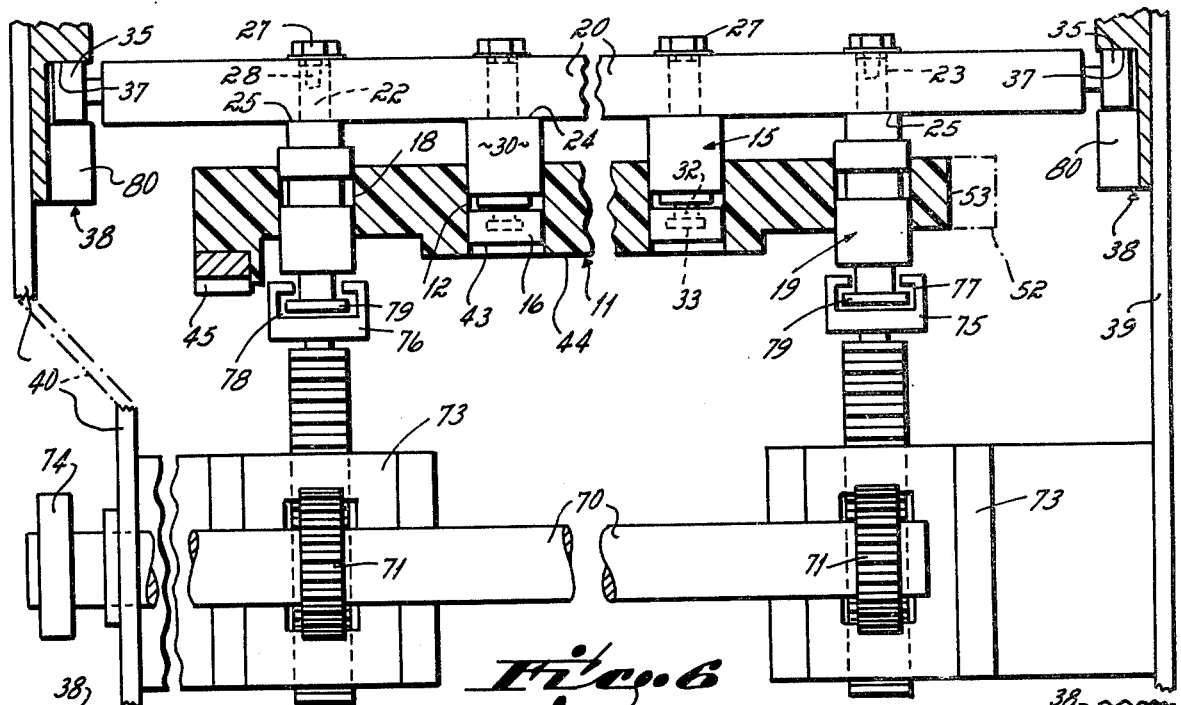
FIG. 6 is a cross-sectional view of the apparatus for removing the sintered dies from the die roll.

Referring first to FIGS. 1 and 2 there is illustrated a preferred embodiment of the apparatus incorporating the invention of this application. This apparatus is illustrated as used in making up round sausage patties and depositing them on a conveyor as the conveyor moves beneath a rotary die roll 11. Of course the machine could deposit the product on any type of substrate, such as pizza pies moving through the machine.

There are a plurality of radial cavities or openings 12 extending from the periphery of the die roll into the hollow interior 13. The cavities 12 are arranged about the roll 11 in a series of circumferential rows, the cavities of each row being longitudinally aligned with cavities of other circumferential rows so as to form columns of cavities longitudinally of the roll 11. Of course, the cavities may be arranged in any desired pattern, as for example, if the apparatus is used to deposit sausage patties on the top of pizza pies, the pattern of cavities would be the same as the pattern to be deposited upon the pizza pies.

Referring now to FIGS. 3–6 it will be seen that there are die pins 15 slideably mounted within each of the die cavities 12. At its outer end each die pin removably supports a sintered die 16, as explained more fully hereinafter.

In addition to the rows and columns of cavities 12 for supporting the die pins 15, adjacent each end of the die roll 11 there is a circumferential row of cavities 18 which slideably support guide pins 19. The cavities 18 of the die roll are equal in number and longitudinally aligned with the die cavities 12.

Located on the die roll interiorly of each column of longitudinally aligned die cavities 12 and guide pin cavities 18 are a plurality of guide rods 20. These guide rods function to support the inner ends of die pins 15 and guide pins 19. To this end each die pin 15 and guide pin 19 has a small diameter inner end section 22 received within a bore 23 of the guide rod 20. This small diameter section 22 terminates in a shoulder 24 on the die pins 15 and a shoulder 25 on the guide pins 19. The guide rod 20 is secured in bearing engagement with these shoulders 24, 25 by screws 27 which are threaded into threaded bores 28 of the die pins 15 and guide pins 19.

Figure 8:
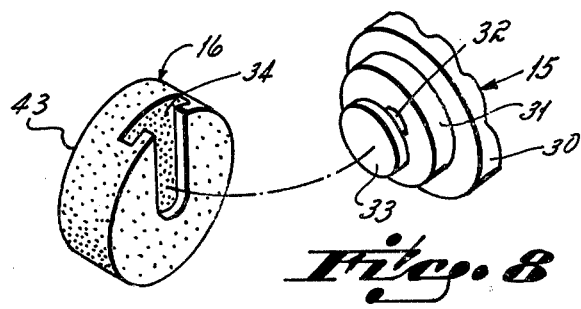
FIG. 8 is a perspective view of the sintered die and the end of the die pin upon which the die mounts.

At its outer end, each die pin 15 has a large diameter body section 30 slideable within the cavities 12 of the die roll. A smaller diameter section 31 extends outwardly from the large diameter section 30 and an even smaller diameter section or neck 32 extends forwardly from the small diameter section 31. At its outermost end the small diameter neck 32 terminates in a head 33. As may be seen most clearly in FIG. 8, this head receives a keyway slot 34 formed on the inner end of each sintered die 16 such that the die 16 may be slipped onto the head 33 of one of the die pins and held in axial alignment with the die pin.

At its ends, each guide rod 20 rotatably supports a guide roll 35. These guide rolls 35 move within an eccentric cam slot 37 of a cam 38 secured to opposite side plates 39, 40 of the machine frame. As the die roll rotates, it causes the die pins 15 and connected guide rods 20 and guide pins 19 to rotate with it. In the course of rotating about the axis 42 of the die roll, the rollers 35 attached to the ends of the guide rod are caused to follow the cam slot 37. Because of the eccentricity of the slot about the axis 42, the guide rods 20 and attached die pins 15 and guide pins 19 are caused to move toward and away from the axis as the roll makes a complete revolution about the roll axis 42. This results in the sintered dies 16 attached to the outer end of the guide pins 15 being moved in and out relative to the die cavities 12.

Figure 9:
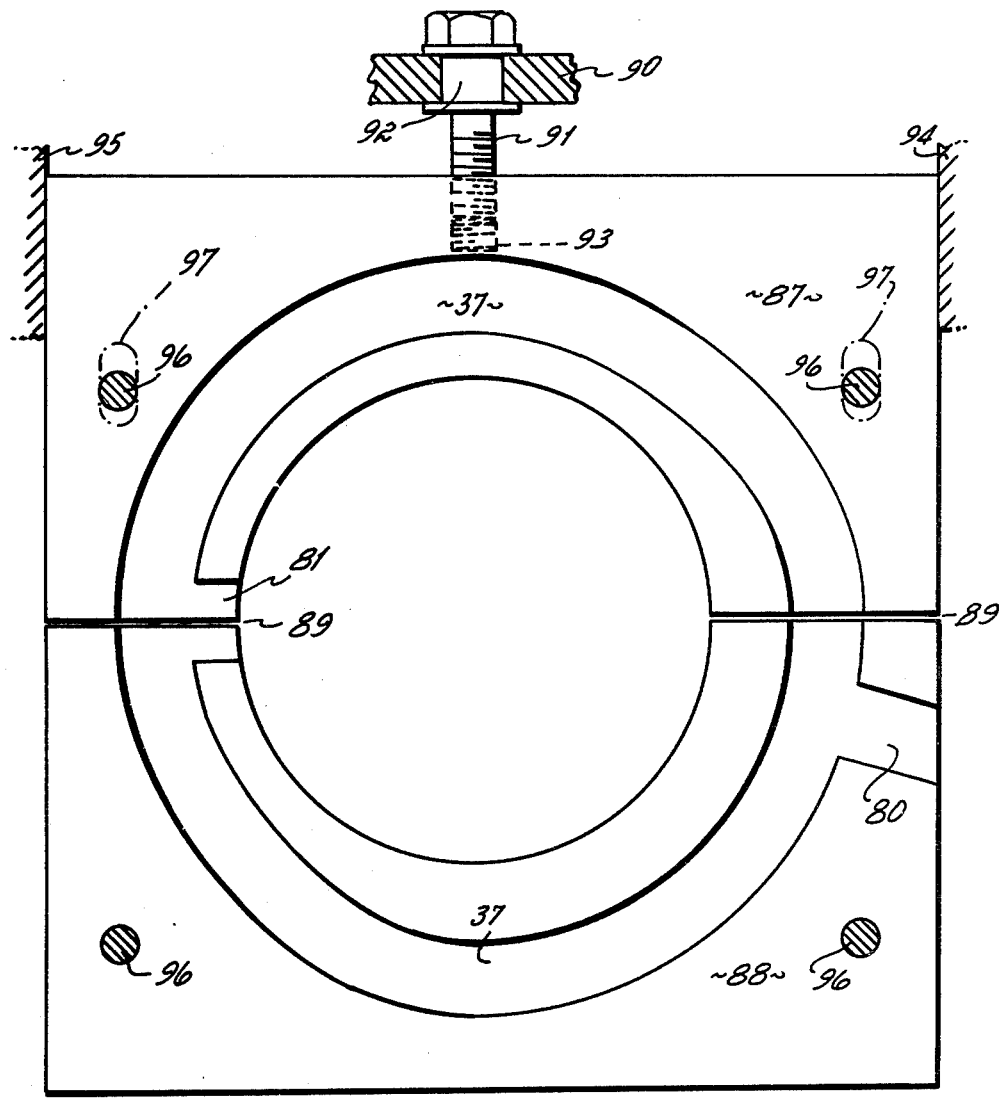
FIG. 9 is a side elevational view of a cam control plate employed in the apparatus of this invention.

Referring to FIG. 9, there is illustrated one of the cam slots 37 containing cam 38. Since the two cams 38 are mirror images of one another, only one is described in detail herein. As may be seen in FIG. 9, the cam 38 is made in two pieces 87, 88 the lower 88 of which is fixed the frame side plates 39, 40 by screws 96 and the upper half 87 of which is vertically adjustable relative to the side plates. To facilitate this adjustment, the upper half 87 of the cam is secured to the side plates by screws 96 which enter through slots 97 of the side plates and side plate guides 94, 95 engageable with the side edges of the upper half of the cam 87. An adjustment screw 91 rotatably extends through a fixed section 90 of the frame of the machine and is threaded into the upper half of the cam 87 such that when the screw is rotated, the upper half 87 of the cam is caused to move up or down, depending upon the direction of rotation of the screw. The adjusted height of the upper half of the cam track determines the depth that the dies 16 move into the cavities 12 of the die roll in the course of passage beneath the feed rolls, thereby the quantity of product loaded into each of the cavities 12 during each revolution of the die roll is determined. To change this determination, it is only necessary to adjust the upper half 87 of the cam track 38 up or down, depending upon whether the quantity of product to be deposited upon the substrate is to be decreased or increased.

As may be seen more clearly in FIG. 3, when the dies are extended outwardly, the outer faces 43 of the dies 16 are generally located in the plane of the peripheral surface 44 of the die roll 11. This occurs when the dies are in their lowermost or 6 o'clock position as viewed in FIG. 3. At their innermost position, which generally occurs when the dies are in the 1 to 12 o'clock position, the dies and associated cavities 15 are in a position to receive deposits of food product, as for example meat 7 from a hopper 6.

Referring now to FIGS. 1 and 6, it will be seen that there is a ring gear 45 fixedly secured about the periphery of the die roll 11. This ring gear 45 is drivingly connected with a drive gear 46 (FIG. 1) which, when driven from any conventional drive source, causes the roll to rotate at a predetermined speed.

The drive roll is supported for rotation upon support rolls 48, 49 which extend between and are supported by the side plates 39, 40 of the machine.

Located adjacent each longitudinal column of die cavities 12 in the die roll 11 there is a longitudinal air passage 50, the number of longitudinal passages being equal to the number of columns of die cavities. Each of these longitudinal passages 50 is connected by a passage 51 to one of the cavities 12 in the die roll. Air at a pressure above that of the atmosphere, as for example at 50 pounds per square inch, is supplied through these passages 50, 51 into each of the cavities 12 as the longitudinal passages 50 move past a port plate 52 sealingly engaged with the one side edge 53 of the die roll 11. This port plate 52 has an arcuate recess 54 formed on its inner surface which communicates with the passages 50 as those passages move past the arcuate slot 54. Air at a pressure above that of atmosphere is supplied to arcuate passage 54 by an air line 55.

Referring now to FIG. 1, it will be seen that the air passage 55 is supplied with air at a pressure above that of atmosphere from a conventional air pressure source 56. This air line, in passing from the air pressure source 56 to the port plate 52 passes through an air heating unit 57, an air refrigeration unit 58, a vegetable oil misting unit 59, and a one-way check valve 60. The heating unit 57 and refrigeration unit 58 are intended to be used alternately depending upon the food product to be processed in the apparatus. If the food product is a meat product, as for example sausage or ground beef, which is generally handled at a temperature close to its freezing temperature, the air is heated by the unit 57 to prevent grease contained in the meat from congealing and clogging the pores of the sintered die 16. Alternatively, if the food being processed in this apparatus is cookie dough which tends to stick to the pores of the sintered die, the air is refrigerated so as to chill the surface of the dough contacting the die and prevent the dough from adhering to the die. The vegetable oil misting unit 59 serves to drip vegetable oil into the air line 55 wherein it is misted before reaching the die 16. In passing through the die, the vegetable oil mist lessens the tendency of the food product to stick to the die and to the food cavity 15 in the die roll.

For cleaning purposes there is a high pressure source of heated water 61, as for example, a source of water at 900 pounds per square inch pressure and a temperature of 200° F., available for supplying water through a flow control valve 62 into the air line 55 and subsequently through the air flow passages 50, 51 and the sintered dies 16. The check valve 60 prevents water from the source 61 from flowing back through the line 55 toward the vegetable oil misting unit and the refrigeration and heating units. By operating the machine with the die roll 11 rotating and high pressure, hot water being supplied from source 61 through the port plate 52, the complete die roll may be flushed of contaminants and thereby cleaned. If so desired caustic soda or other additives may be added to the water so as to further the cleansing of the apparatus when hot water is supplied through it.

Referring again to FIG. 1 there is mounted atop the die roll 11 a pair of feed rolls 63, 64. These rolls are driven by a gear or other drive source 65 at a speed such the rolls feed food product 7 contained within the hopper 6 downwardly between the feed rolls into a generally triangular cavity 66 defined by the peripheral surface of the rolls 63, 64 and the peripheral surface 44 of the die roll 11. The speed of the drive roll 65 and consequently of the feed rolls 63, 64 is determined so as to maintain food products 7 contained within the cavity 66 at a pressure above atmosphere so that the food product 7 is forced downwardly into the open cavities 12 of the die roll 11 as those cavities move past the food opening cavity 66. To facilitate this feeding movement by the feed rolls 63, 64 the rolls preferably have tapered longitudinal grooves 83 (FIGS. 2 and 3) on their outer surface. To prevent food contained within the opening 66 from escaping between the feed rolls and the die roll there are preferably shaped seals 84, 85 mounted on the outer end of arms 69 which close the opening 66. The outer edge of these arms 69 terminates in a scraper edge 67 which contacts the die roll and cuts off any excess product contained within the recesses 12 of the die roll.

Periodically, in the use of any food processing equipment, that equipment must be thoroughly cleaned to prevent growth of bacteria within particles of food which escape and become trapped in the apparatus. This cleansing of the apparatus is particularly critical in the case of apparatus used to process meat products. To that end the complete apparatus disclosed herein must be thoroughly cleaned and additionally sintered dies 16 must be periodically and regularly removed from the die roll and cleansed by the passage of steam through the dies at a very high temperature. To this end, the dies 16 are intended to be removed from the die roll and new dies substituted without disassembly of the die roll or even removal of the die roll from the machine. For that reason, there is mounted on the machine frame side plates 39, 40 a rotatable shaft 70 which carries a pair of gears 71, 71 engageable with racks 72. These racks are slideably mounted within guide plates 73 which are attached to the side plates 39, 40. To facilitate rotation of the shaft 70 a lever 74 is attached to one end such that when the lever is rotated, the gears 71 rotate and thereby effect longitudinal movement of the racks 72. At their innermost end the racks 72, 72 carry forks 75, 76. Each fork has a dovetail shaped slot 77, 78 therein. The heads 79 formed on the outer end of each guide pin 19 are movable through these dovetail shaped slots 77, 78 as the die roll is rotated.

Figure 7:
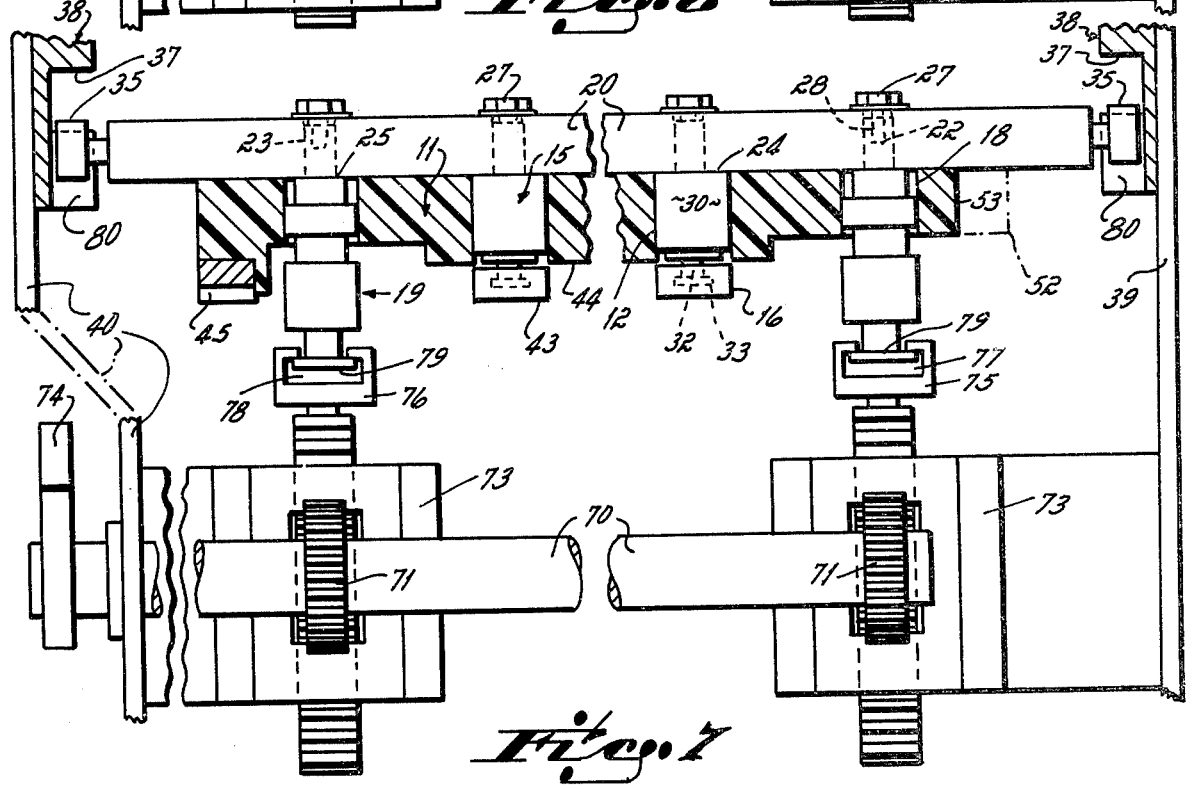
FIG. 7 is a view similar to FIG. 6 but illustrating the die removal apparatus in a different position from that illustrated in FIG. 6.

Whenever the sintered metal dies 16 are to be removed for cleansing, the die roll 11 is stopped in a position in which the guide pins 19 of one guide rod 20 are located within the slots 77, 78 of the forks 75, 76. With the die roll so positioned, the lever 77 may be rotated so as to pull the heads 79 of the guide pins outwardly, thereby causing the attached guide rod to move outwardly and to move the attached die pins 15 outwardly. At the outer end of the movement of the guide pins 19, the guide rod 20 contacts the inner surface of the die roll. The dies 16 are then located in the position illustrated in FIG. 7. That is, the dies 16 are then completely outside the peripheral surface 44 of the die roll. In this position, the dies may be moved radially relative to the die pins 15 and thereby removed from the die pins 15. The keyway shaped slot 34 of the dies 16 permit this radial movement of the sintered dies 16 relative to the die pins so as to effect removal and/or reattachment of the sintered dies to the pins 15. After attachment of a new, clean set of sintered metal dies 16, the lever 77 is rotated in a direction so as to reposition the guide pins 19 back into the die roll.

It is to be noted that in moving the guide rod 20 outwardly the rollers 35 attached to the guide rods 20 must move out of the eccentric slot 37. This outward movement of the rollers out of the eccentric slot is permitted by a radially extending slot 80 which is aligned with the rollers 35 when the guide pins of the selected guide rod are positioned within the forks 75, 76 of the die removal apparatus.

In addition to the outwardly extending radial slot 80, there is another radial slot 81 which extends inwardly from the eccentric slot 37. This slot in each of the cams 38 is provided to permit the insertion of the rollers 35 of the guide rods 20 into the eccentric slots 37 when the apparatus is initially assembled.

OPERATION

In the operation of the apparatus, food products as for example a meat product or cookie dough or any other food product which is to be deposited by the die roll onto a substrate, is loaded onto hopper 6. In one preferred embodiment the apparatus is used to process sausage meat for application onto pizza pies. In this application the bulk sausage is loaded onto the hopper at a temperature very close to the freezing temperature of meat, 27° F. In general the meat is at a temperature in the range of between 25° F. and 30° F. when loaded into the hopper 6. The apparatus is turned on by first turning on air pressure to the port plate 52 such that heated air, generally on the order of 250° F., is supplied to the port plate. The depositor roll or die roll 11 is then caused to be rotated by actuation of the drive gear 46 and simultaneously, actuation of the feed roll drive 65 is initiated. This operation initiates feed of the bulk sausage from the hopper downwardly into the opening 66 between the feed rolls and the die roll wherein the sausage is pressurized and caused to be forced into the then open die cavities 12 of the die roll. As the open cavities pass the opening 66 a predetermined weight of sausage is forced into each cavity. Any excess meat is wiped off by the wiper 67 on the end of the arm 69 as the die roll cavity passes that wiper. As the dies move downwardly toward the 6:30 position, they are moved to their outwardmost limit by the cam track 37. When a column of cavities reaches approximately the 6:30 position, as viewed in FIGS. 1 and 3, the longitudinal air passage 50 which communicates with that row of cavities moves into communication with the arcuate air passage 54 of the port plate 52. Heated air is then supplied at a pressure generally on the order of 50 pounds per square inch from the air line 55 through passage 54 of the port plate 52 into the longitudinal passage 50 and subsequently through the passages 51 into the die cavities 12 and to the underside of the dies 16. As illustrated in FIG. 3 upon continued counterclockwise movement of the dies 16 toward the 6 o'clock position, the predetermined weight of sausage of other food product is blown free by the air which is passing outwardly through the pores of the sintered metal die. This results in the sausage or meat product being deposited onto the moving substrate or conveyor 9 located beneath the die roll.

In this application in which the apparatus is used to deposit sausage onto a substrate, air temperature in line 55 is maintained at a temperature approximately 250° F. to insure that fat contained within the sausage does not congeal and thereby effect closing of the pores of the sintered metal die 16. In another application of this apparatus in which it is used to deposit cookie dough wafers onto a substrate, the air in the line 55 is refrigerated by the unit 58 so that it is supplied to the port plate 52 at a temperature on the order of 30° F. At this temperature the air causes the cookie dough, which is generally at a temperature of approximately 80° F., to chill within the die cavity so that when the die moves outwardly to eject the wafer contained within the cavity, the chilled dough does not stick to the pores of the sintered die.

While I have described only one preferred embodiment of the apparatus and only two specific applications of it, persons skilled in the art will recognize various changes and modifications which may be made without departing from the spirit of my invention. Therefore, I do not intend to be limited except by the scope of the following appended claims.

Having described my invention, I claim:

1. A machine for producing configurated products comprising:
   a rotary die roll having an open interior and cavities arranged in a series of circumferential rows, the cavities of the circumferential rows being aligned in columns longitudinally of the roll,
   movable dies disposed in each of said cavities, said dies being made from a porous material,
   means for introducing said product into said die cavities,
   means for ejecting said product from said cavities, said ejection means comprising
   means for moving said dies outwardly in said cavities until the outer surfaces of said dies are approximately flush with the surface of said roll, and
   gas supply means including longitudinal passages in said die roll for supplying gas at a regulated pressure through said passages in said die roll to the underside of said porous dies and outwardly through said porous dies as said dies are moved outwardly in said die cavities, said gas being operable to eject said product from said dies and to prevent said product from sticking to and clogging the pores of said porous dies, said gas supply means including a port plate sequentially connectable with said longitudinal passages during rotation of said die roll, conduit means connecting said gas supply means to said port plate, and
   means including control valve means for selectively directing high temperature, high pressure water to said port plate and to said passages during rotation of said die roll so as to clean said passages and cavities of product contained therein.

2. The machine of claim 1 in which said gas supply means includes gas temperature control means, said gas temperature control means including a heating unit for heating said gas before it is directed to the underside of said porous dies.

3. The machine of claim 1 in which said gas supply means includes gas temperature control means, said gas temperature control means including a refrigeration unit for cooling said gas before it is directed to the underside of said porous dies.

4. The machine of claim 1 in which said gas supply means includes means for misting vegetable oil into said gas before it is directed to the underside of said porous dies, said vegetable oil being operable to lubricate said dies and die cavities so as to prevent said product from sticking to said dies and die cavities.

5. The machine of claim 1 wherein said die moving means comprises a plurality of longitudinally extending guide rods, each of said guide rods being located within the interior of said die roll and operatively associated with one column of dies contained within a longitudinal column of die roll cavities, each of said rods having its opposite ends movably mounted within a stationary eccentric cam track such that the guide rods and associated dies are caused to move in and out relative to said die roll cavities as said die roll is rotated.

6. The machine of claim 5 wherein die pins extend between said guide rods and each of said porous dies.

7. The machine of claim 6 wherein each of said die pins has an enlarged head at its outer end, each of said porous dies having a keyway slot formed on its inner end and adapted to be slipped over the head at the outer end of one of said die pins so as to secure said dies to said die pins.

8. The machine of claim 7 which further includes die removal means mounted upon said machine for moving said dies outwardly completely out of said die roll cavities so as to enable said dies to be cleaned after removal from said die pins.

9. A machine for producing configurated products comprising:
   a rotary die roll having an open interior and cavities arranged in a series of circumferential rows, the cavities of the circumferential rows being aligned in columns longitudinally of the roll,
   movable dies disposed in each of said cavities, said dies being made from a porous material,
   means for introducing said product into said die cavities,
   means for ejecting said product from said cavities, said ejection means comprising,
   means for moving said dies outwardly in said cavities until the outer surfaces of said dies are approximately flush with the surface of said roll,
   said die moving means comprising a plurality of lonitudinally extending guide rods, each of said guide rods being located within the interior of said die roll and operatively associated with one column of dies contained within a longitudinal column of die roll cavities, each of said rods having its opposite ends movably mounted within a stationary eccentric cam track such that the guide rods and associated dies are caused to move in and out relative to said die roll cavities as said die roll is rotated, die pins extending between said guide rods and each of said porous dies, each of said die pins having an enlarged head at its outer end, each of said porous dies having a keyway slot formed on its inner end and adapted to be slipped over the head at the outer end of one of said die pins so as to secure said dies to said die pins, die removal means mounted upon said machine for moving said dies outwardly completely out of said die roll cavities so as to enable said dies to be cleaned after removal from said die pins, said die removal means comprising means mounted upon said machine for moving said guide rods outwardly out of said eccentric cam tracks and thereby effecting movement of said associated dies outwardly out of said die roll cavities, and gas supply means for supplying gas through passages in said die roll to the underside of said porous die and outwardly through said porous dies as said dies are moved outwardly in said die cavities, said gas being operable to eject said product from said dies and to prevent said product from sticking to and clogging the pores of said porous dies.

10. The machine of claim 9 which further includes a pair of guide pins extending through cavities in said die roll and fixedly connected to opposite ends of said guide rods.

11. The machine of claim 10 wherein said die removal means is engageable with said guide pins to effect outward movement of said guide rods and associated dies.

12. The machine of claim 11 wherein said die removal means comprises fork shaped gripper means selectively engageable with said guide pins, said gripper means being mounted upon a rack movable toward and away from said die roll in response to rotary movement of a gear rotatably secured to the frame of said machine.

13. A machine for producing configurated products comprising:
   a rotary die roll having an open interior and cavities arranged in a series of circumferential rows, the cavities of the circumferential rows being aligned in columns longitudinally of the roll,
   movable dies disposed in each of said cavities, said dies being made from a porous material,
   means for introducing said product into said die cavities,
   means for ejecting said product from said cavities, said ejection means comprising
   means for moving said dies outwardly in said cavities until the outer surfaces of said dies are approximately flush with the surface of said roll,
   gas supply means for supplying gas at a regulated pressure through passages in said die roll to the underside of said porous dies and outwardly through said porous dies as said dies are moved outwardly in said die cavities,
   said die moving means comprising a plurality of longitudinally extending guide rods, each of said guide rods being located within the interior of said die roll and being operatively associated with one column of dies contained within a longitudinal column of die roll cavities,
   die pins extending between said guide rods and each of said porous dies,
   each of said die pins having an enlarged head at its outer end, each of said porous dies having a keyway slot formed on its inner end and adapted to be slipped over the head at the outer end of one of said die pins so as to secure said dies to said die pins,
   die removal means mounted upon said machine for moving said dies outwardly completely out of said die roll cavities so as to enable said dies to be cleaned after removal from said die pins, and
   each of said guide rods having its opposite ends movably mounted within a stationary eccentric cam track such that the guide rods and associated dies are caused to move in and out relative to said die roll cavities as said die roll is rotated, said die removal means comprising means mounted upon said machine for moving said guide rods outwardly out of said eccentric cam tracks and thereby effecting movement of said associated dies outwardly out of said die roll cavities.

14. The machine of claim 13 which further includes a pair of guide pins extending through cavities in said die roll and fixedly connected to opposite ends of said guide rods.

15. The machine of claim 14 wherein said die removal means is engageable with said guide pins to effect outward movement of said guide rods and associated dies.

16. The machine of claim 15 wherein said die removal means comprises fork shaped gripper means selectively engageable with said guide pins, said gripper means being mounted upon a rack movable toward and away from said die roll in response to rotary movement of a gear rotatably secured to the frame of said machine.

* * * * *